US008817776B2

(12) United States Patent
Deng et al.

(10) Patent No.: US 8,817,776 B2
(45) Date of Patent: Aug. 26, 2014

(54) METHOD TO SHARE PHONE LINE

(75) Inventors: Hui Deng, San Ramon, CA (US); Jianming Tu, Shanghai (CN)

(73) Assignee: ArcSoft (Shanghai) Technology Company, Ltd., Shanghai (CN)

( * ) Notice: Subject to any disclaimer, the term of this patent is extended or adjusted under 35 U.S.C. 154(b) by 381 days.

(21) Appl. No.: 12/811,077

(22) PCT Filed: Dec. 28, 2007

(86) PCT No.: PCT/US2007/089150
§ 371 (c)(1),
(2), (4) Date: Oct. 20, 2010

(87) PCT Pub. No.: WO2009/085053
PCT Pub. Date: Jul. 9, 2009

(65) Prior Publication Data
US 2011/0044322 A1    Feb. 24, 2011

(51) Int. Cl.
*H04L 12/66* (2006.01)

(52) U.S. Cl.
USPC .......................................... 370/352; 370/353

(58) Field of Classification Search
USPC ................................................ 370/352–353
See application file for complete search history.

(56) References Cited

U.S. PATENT DOCUMENTS

| 6,483,835 | B1 * | 11/2002 | Tanigawa et al. | 370/395.21 |
|---|---|---|---|---|
| 6,608,831 | B1 * | 8/2003 | Beckstrom et al. | 370/352 |
| 6,738,824 | B1 * | 5/2004 | Blair | 709/238 |
| 2002/0176374 | A1 * | 11/2002 | Lee et al. | 370/260 |
| 2003/0012356 | A1 * | 1/2003 | Zino et al. | 379/219 |
| 2003/0154249 | A1 | 8/2003 | Crockett et al. | |
| 2003/0231595 | A1 * | 12/2003 | Zino et al. | 370/238 |
| 2006/0002371 | A1 | 1/2006 | Chen | |
| 2006/0146792 | A1 * | 7/2006 | Ramachandran et al. | 370/352 |
| 2006/0251054 | A1 * | 11/2006 | Peters et al. | 370/352 |
| 2007/0025264 | A1 | 2/2007 | Cheng et al. | |
| 2007/0140217 | A1 | 6/2007 | Benco et al. | |
| 2007/0253348 | A1 | 11/2007 | Sammarco | |
| 2008/0293403 | A1 * | 11/2008 | Quon et al. | 455/426.1 |
| 2009/0016368 | A1 * | 1/2009 | Lowekamp | 370/401 |

OTHER PUBLICATIONS

Lowekamp, System and Method for Obtaining Localized Information Through a Structured Overlay Network, Jul. 5th 2007, U.S. Appl. No. 60/958,604, pp. 1-19.*
International Search Report and Written Opinion, 9 pages.
International Preliminary Report on Patentability, 7 pages.

* cited by examiner

*Primary Examiner* — Nicholas Jensen
(74) *Attorney, Agent, or Firm* — Patent Law Group LLP; David C Hsia (57) ABSTRACT

A first method for sharing telephone resources includes a VoIP device connecting to a first device over an IP network, receiving a request from the first device to call a second device with a telephone number, connecting to the second device through a telephone system, and transferring voice signals between the first and second devices. A second method for sharing telephone resources includes a first VoIP device joining a group of VoIP devices connected to an IP network to share their telephone resources, receiving from a caller a telephone number to call a device, connecting to a second VoIP device from the group over the IP network, transmitting the telephone number to the second VoIP device so the second VoIP device connects to the device through a telephone system, and transmitting to and receiving from the second VoIP device voice signals between the caller and a recipient at the device.

15 Claims, 8 Drawing Sheets

Fig. 10 ent of the invention.

METHOD TO SHARE PHONE LINE

CROSS REFERENCE TO RELATED APPLICATIONS

This application is related to (1) U.S. patent application Ser. No. 11/280,688, entitled "Using PSTN to Communicate IP Addresses for Point-To-Point Text, Voice, Video, or Data Communication," (2) U.S. patent application Ser. No. 11/618, 741, entitled "Using Secondary Channels to Communicate IP Addresses for Point-To-Point Communication," (3) U.S. application Ser. No. 11/618,739, entitled "Determining Pairings of Telephone Numbers and IP Addresses from Caching and Peer-to-Peer Lookup," and (4) U.S. application Ser. No. 11/618,740, entitled "Regional Service by Phone," which are commonly assigned and incorporated herein by reference.

FIELD OF INVENTION

This invention relates to a method to share a telephone line over a computer network.

DESCRIPTION OF RELATED ART

A conventional VoIP telephone system has three main components: the VoIP telephone or telephone adapter, the VoIP gateway, and the PSTN. The VoIP gateway bridges the VoIP system and the PSTN. Many VoIP systems provide free PC-to-PC telephone calls. However, the VoIP systems typically charge fees for PC-to-telephone calls. For example, Skype allows free PC-to-PC telephone calls but charges for PC-to-telephone calls. PSTN and traditional VoIP systems do not operate like the Internet where resources can be shared. Thus, the PSTN and the traditional VoIP telephone lines are wasted when they are not being used. This is especially true if a household is paying a monthly fee for the PSTN or the traditional VoIP telephone service.

SUMMARY

In one embodiment of the invention, a first method is provided for a Voice over Internet Protocol (VoIP) device connected to an IP network and a telephone system to share its telephone resource. The method includes the VoIP device connecting to a first device over the IP network, receiving a request from the first device to call a second device with a telephone number, connecting to the second device through the telephone system, and transferring voice signals between the first and the second devices.

In another embodiment of the invention, a method is provided for a first VoIP device connected to an IP network and a first telephone system to share its telephone resource. The method includes the first VoIP device joining with a group of VoIP devices connected to the IP network to share their telephone resources, receiving from a caller a telephone number to call a device, connecting to a second VoIP device from the group of the VoIP devices over the IP network, transmitting the telephone number to the second VoIP device so the second VoIP device connects to the device through a second telephone system, and transmitting to and receiving from the second VoIP device voice signals between the caller and a recipient at the device.

BRIEF DESCRIPTION OF THE DRAWINGS

Use of the same reference numbers in different figures indicates similar or identical elements.

DETAILED DESCRIPTION OF THE INVENTION

Embodiments of the invention provide individual and group sharing of telephone services. For individual sharing, a user uses his telephone service at a location when he is away from that location. For example, the user connects to his home telephone service over a computer network and then uses his home telephone service to make telephone calls. For group sharing, users join a sharing group that that pools their telephone resources together so that one member can use the telephone service of another member. For example, a first member connects to a second member over a computer network and then has the second member call a person local to the second member to complete a call for the first member. These embodiments allow the users to save costs on telephone calls and to fully use the telephone services they pay for but may otherwise underutilize.

Figure 1:
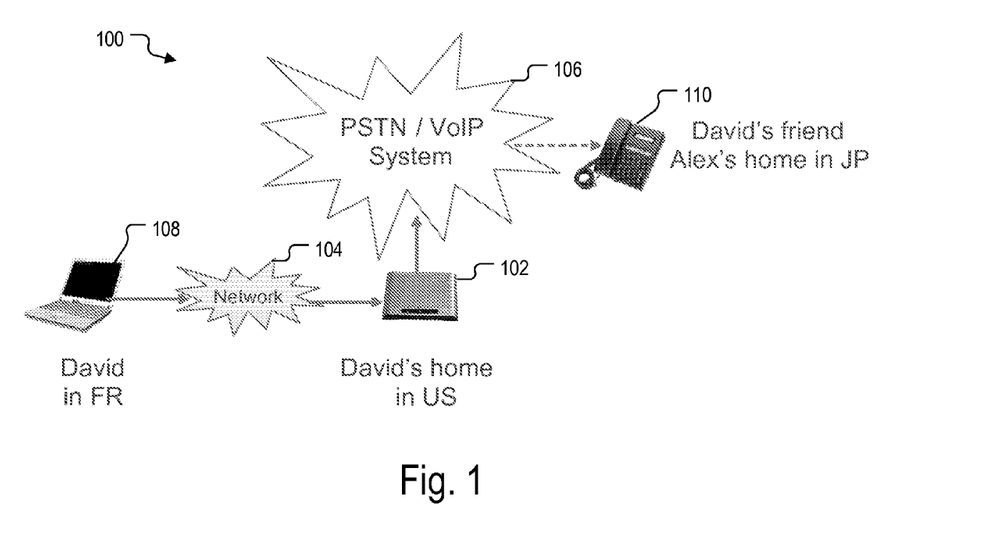
FIG. 1 illustrates a system for individual sharing of a telephone line in one embodiment of the invention.

FIG. 1 illustrates a system 100 for individual sharing of a telephone line in one embodiment of the invention. Specifically, system 100 allows a caller to use a telephone service provided at a location (e.g., his home) when he is away from that location. System 100 includes a Voice over Internet Protocol (VoIP) device 102 that allows the caller to make telephone calls. Examples of VoIP device 102 are described in the applications incorporated by reference.

VoIP device 102 is connected to an Internet Protocol (IP) network 104 (e.g., the Internet). VoIP device 102 is also connected to a telephone system 106 that provides telephone service to the user. Telephone system 106 can be a public switched telephone network (PSTN), a VoIP system, or both. When telephone system 106 includes a VoIP system, VoIP device 102 is connected to the VoIP system over IP network 104. A caller's computer or VoIP telephone 108 is able to connect to VoIP device 102 over IP network 104. VoIP device 102 in turn is able to connect to a telephone 110 through telephone system 106. Telephone 110 can be a plain old telephone service (POTS) or a VoIP telephone.

While the user is able to call telephone 110 from his current location away from home (e.g., using a POTS telephone), such a call is typically more expensive than calls made with his telephone service at home. Thus, system 100 aims to save costs on telephone calls by fully utilizing the telephone services the user pays for but may otherwise underutilize.

Figure 2:
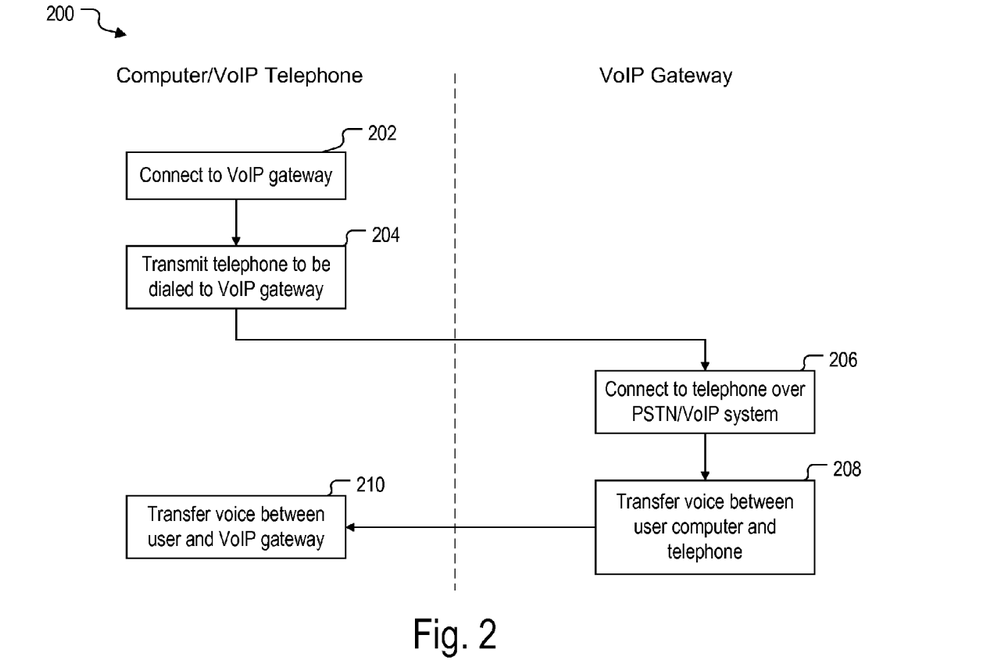
FIG. 2 is a flowchart of a method for individual sharing of a telephone line in one embodiment of the invention.

FIG. 2 is a flowchart of a method 200 for individual sharing of a telephone line in one embodiment of the invention. To demonstrate method 200, assume a caller named David is in France on vacation and away from his home in the U.S. David wishes to make a call to his friend Alex in Japan using the telephone service at his home. In method 200, David uses computer 108 to connect to VoIP device 102 at his home in the U.S., and then uses VoIP device 102 to establish a telephone call with Alex's telephone 110 in Japan.

In step 202, computer 108 connects to VoIP device 102 over IP network 104. VoIP device 102 may authenticate the caller on computer 108 using a username and a password.

In step 204, computer 108 begins a telephone call to telephone 110 by transmitting telephone commands to VoIP device 102. The telephone commands include on hook, off hook, and the telephone number to be dialed. Computer 108 transmits the telephone commands in packets over IP network 104 to VoIP device 102.

In step 206, VoIP device 102 calls telephone 110 through telephone system 106 in response to the telephone commands from computer 108.

In steps 208 and 210, VoIP device 102 and computer 108 transfer voice signals between David at computer 108 and Alex at telephone 110. If VoIP device 102 is connected to telephone 110 over a PSTN 106, it must convert the digital signals received from computer 108 to analog telephone signals before transmitting them over the PSTN, and it must convert the analog telephone signals received from the PSTN to digital signals before transmitting them to computer 108. If VoIP device 102 is connected to telephone 110 over a VoIP system 106, it passes the digital signals between computer 108 and the VoIP system in accordance with VoIP standards, such as H.323, Session Initiation Protocol (SIP), Real-time Transport Protocol (RTP), G.711, G.729, and G.723.

Figure 3:
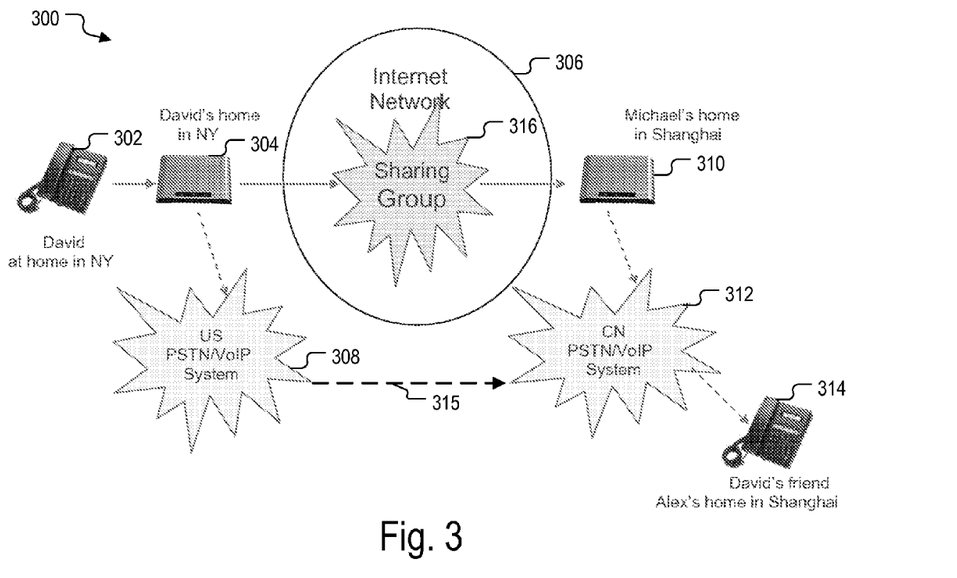
FIG. 3 illustrates a system for group sharing of telephone lines in one embodiment of the invention.

FIG. 3 illustrates a system 300 for group sharing of telephone lines in one embodiment of the invention. System 300 includes a telephone 302 connected to a VoIP device 304 located in a first area, region, or country (collectively hereafter as "the first region"). VoIP device 304 is connected to an IP network 306 (e.g., the Internet) and a regional telephone system 308. Regional telephone system 308 provides telephone service at relatively low cost within the first region (e.g., toll-free local calls). Regional telephone system 308 represents a PSTN, a VoIP system, or both. When regional telephone system 308 includes a VoIP system, VoIP device 304 is connected to the VoIP system over IP network 306. Examples of VoIP device 304 are described in the applications incorporated by reference.

System 300 also includes a VoIP device 310 located in a second area, region, or country (collectively hereafter as "the second region"). VoIP device 310 is connected to IP network 306 and a regional telephone system 312. Regional telephone system 312 provides telephone service at relatively low cost within the second region (e.g., toll-free local calls). Regional telephone system 312 represents a PSTN, a VoIP system, or both. When regional telephone system 312 includes a VoIP system, VoIP device 310 is connected to the VoIP system over IP network 306. VoIP device 310 is able to connect to a POTS telephone 314 in the second region through regional telephone system 312. Examples of VoIP device 310 are described in the applications incorporated by reference.

While regional telephone systems 308 and 310 are able to connect over long distance telephone lines 315 (e.g., international telephone lines), such a connection is typically more expensive than a connection over IP network 306 that a user may pay for already. Thus, system 300 aims to save costs on telephone calls by fully using the Internet and telephone services the users pay for but may otherwise underutilize.

Although only two VoIP devices are shown, there can be many such VoIP devices. These devices can join a sharing group 316 to share their telephone resources and to use the telephone resources of other group members. In one embodiment, sharing group 316 is a subgroup in a peer-to-peer network. Specifically, the VoIP devices first join a peer-to-peer network of VoIP devices. After joining the peer-to-peer network, the VoIP devices can then join subgroup 316 in order to share their telephone resources. For the details of joining peer-to-peer networks and groups in the peer-to-peer network, please refer to U.S. application Ser. No. 11/618,740, entitled "Regional Service by Phone," which is incorporated by reference in its entirety.

Although only one sharing group is shown, there can be many such sharing groups. Each sharing group may have different rules for joining the group and sharing the telephone resources. Thus, the user of a VoIP device can choose among the group for one that best matches his needs.

In one embodiment, a master node in sharing group 316 manages the members and the sharing of the telephone resources. The master node may be a member or a dedicated server computer. Alternatively, the function of the master node is implemented on each member of sharing group 316.

Figure 4:
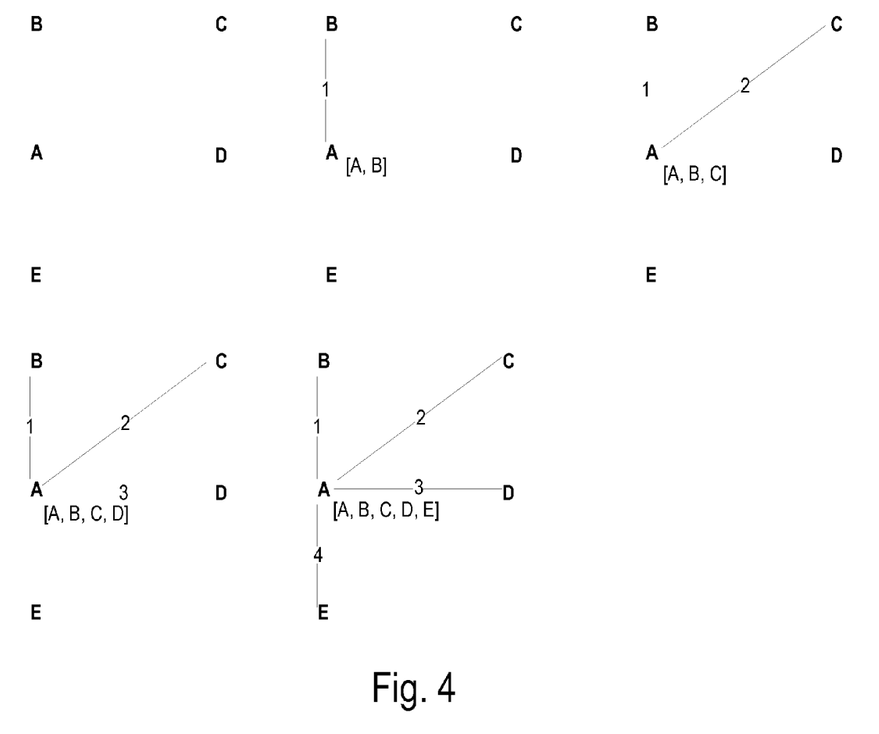
FIG. 4 illustrates a sharing group of the system of FIG. 3 that uses a master node in one embodiment of the invention.

FIG. 4 is a connected graph illustrating the forming of a sharing group 316 using a master node A in one embodiment of the invention. Master node A may be a VoIP device or a dedicated server computer. Initially, master node A only has an empty membership list since members B, C, D, and E have not registered with master node A. The membership list stores the relevant information for each node of sharing group 316, including the telephone number, the IP address, the region, and the performance value of the node. As will be described later in detail, the performance value determines if a member can use and contribute to the shared telephone resources.

When member B registers with master node A through a connection 1, master node A updates its membership list with relevant information of member B. When member C registers with master node A through a connection 2, master node A updates its membership list with relevant information of member C. The same process is repeated for members D and E so master node A eventually has a membership list with the relevant information of members A, B, C, D, and E.

Figure 5:
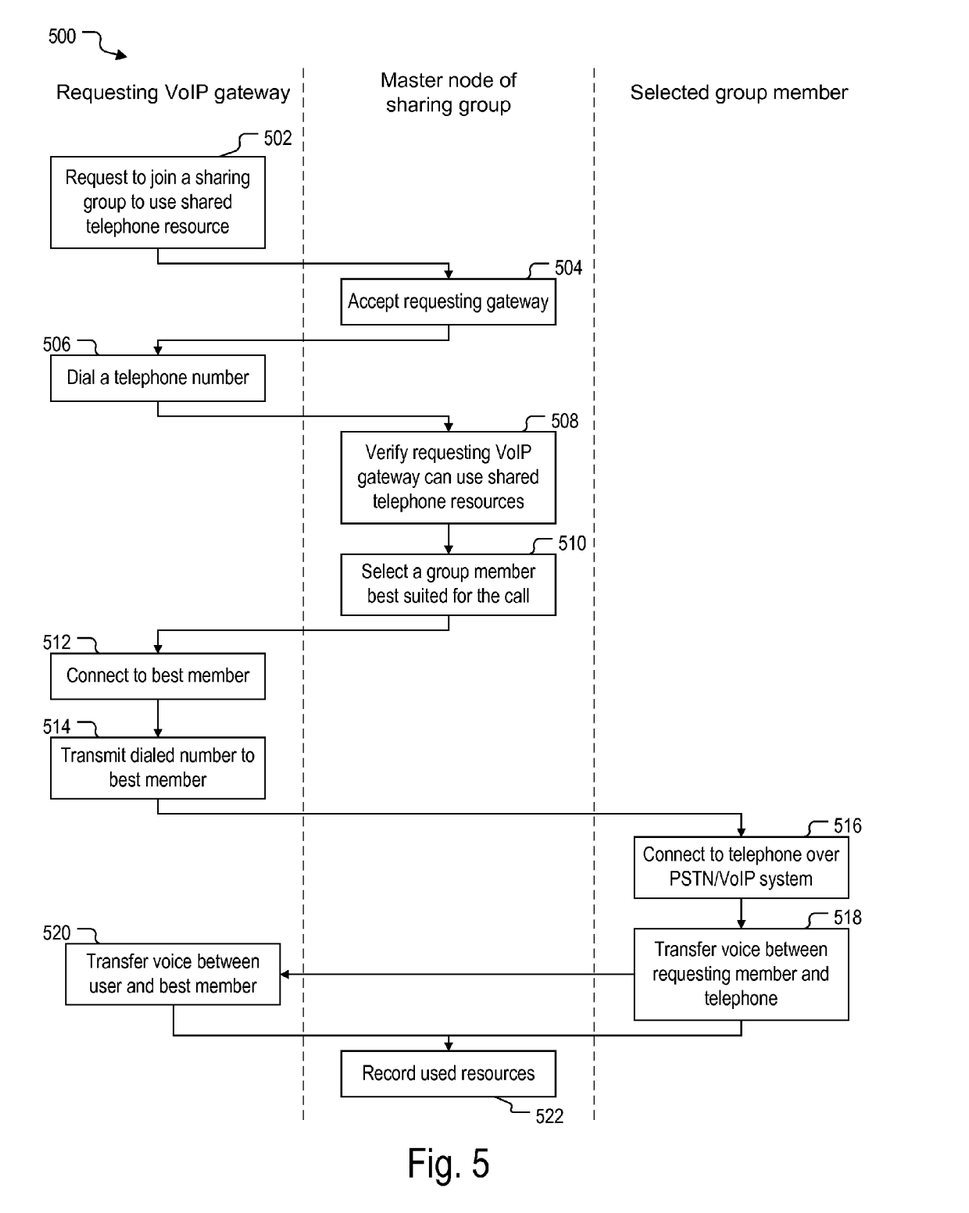
FIG. 5 is a flowchart of a method for the sharing group of FIG. 4 to share telephone lines in one embodiment of the invention.

FIG. 5 is a flowchart of a method 500 for system 300 to share telephone lines through a master node in one embodiment of the invention. In method 500, a member of sharing group 316 or a dedicated server serves as the master node as described above with FIG. 4. To demonstrate method 500, assume David lives in New York, U.S., Michael lives in Shanghai, China, and they are part of sharing group 316. David wishes to call his friend Alex in Shanghai, China. To do so, David's VoIP device 304 (FIG. 3) connects to Michael's VoIP device 310 (FIG. 3) in Shanghai, China, and then uses VoIP device 310 to connect to Alex's telephone 314 (FIG. 3) in Shanghai, China.

In step 502, VoIP device 304 first joins sharing group 316. To become a member, VoIP device 304 connects to a master node of sharing group 316 over IP network and requests to be a member. In the request, VoIP device 304 includes the region where it is located. VoIP device 304 may find the master node by querying any member of sharing group 316 for the master node. During registration, VoIP device 304 provides its telephone number, IP address, and region to the master node. VoIP device 304 also selects a way to pay for the use of the telephone resources of sharing group 316. One way to pay is to contribute the telephone resource of VoIP device 304 to sharing group 316. Another way to pay is to pay with actual money.

In step 504, the master node accepts the request from VoIP device 304 to join sharing group 316. To do this, the master node stores the telephone number, the IP address, and the region of VoIP device 304 in its membership list. The master node also creates a performance value for VoIP device 304 in the membership list. As will be described later in detail, the performance value determines if a member can use and contribute to the shared telephone resources.

Steps 502 and 504 are only performed once. After VoIP device 304 becomes part of sharing group 316, it can proceed to step 506 to call a telephone outside of its regional telephone system 308 using the telephone resources of sharing group 316.

In step 506, VoIP device 304 transmits the number of telephone 314 to the master node over public IP network 306.

In step 508, the master node authenticates VoIP device 304. The master node then verifies that VoIP device 304 has sufficient credit to use the shared telephone resources. This verification is based on the performance value of VoIP device 304, which will be described later in detail.

In step 510, the master node searches for members that are connected to a regional telephone system that can connect to telephone 314 for free or at a low cost. As all the members have previously registered with the master node, it is able to find the members that are located in the same region as telephone 314. The master node then selects the best member and provides the IP address of the best member to VoIP device 304.

The best member has the best network connection, is willing to share, is current idle, has been idle for a long period of time, and has not excessively shared its telephone resources. The master node determines the network connection based on the network performance and condition determined by pinging a member over IP network 306. The master node determines if a member is idle by requesting the line status from the member and the idle time since a last call was received or dialed out. The determination of if a VoIP device has excessively shared its telephone resources is based on the performance value of the VoIP device, which will be described later in detail. For demonstrating method 500, assume VoIP device 310 (FIG. 3) is the best member.

In step 512, VoIP device 304 connects to VoIP device 310 over IP network 306.

In step 514, VoIP device 304 begins the telephone call by transmitting telephone commands to VoIP device 310. The telephone commands include on hook, off hook, and the telephone number to be dialed. VoIP device 304 transmits the telephone commands in packets over network 306 to VoIP device 310.

In step 516, VoIP device 310 consummates the telephone call by calling telephone 314 through regional telephone system 312 (FIG. 3).

In steps 518 and 520, VoIP devices 304 and 310 transfer voice signals between the caller David at telephone 302 and the recipient Alex at telephone 314. If VoIP device 310 is connected to a PSTN, it must convert the digital signals received from VoIP device 304 to analog telephone signals before transmitting them to the PSTN, and it must convert the analog telephone signals received from the PSTN to digital signals before transmitting them to VoIP device 304. If VoIP device 310 is connected to a VoIP system, it passes the digital signals between VoIP device 304 and VoIP system 312 in accordance with VoIP standards, such as H.323, SIP, RTP, G.711, G.729, and G.723.

In step 522, VoIP devices 304 and 310 report the usage of the shared telephone resources to the master node. The master node records the usage to debit payment from the David's account associated with VoIP device 304, and credit payment to the Michael's account associated with VoIP device 310.

In one embodiment of the invention, sharing group 316 tracks the account of the members using a performance value. When a member first joins sharing group 316, the member's account is credited with an initial value "D". Each time or each minute that the member's telephone resource is shared, the member's account is credited with an amount in a unit "S". Similarly, each time or each minute that the member uses the telephone resource of sharing group 316 (i.e., the telephone resource of another member), the member's account is debited with an amount in unit "U". The performance "P" of a member determines if the member gets to use the telephone resources of sharing group 316, and it is calculated as follows:

$$P=D-n*U*x+m*S*y,$$

where "n" is the number of units U, "x" is a coefficient for U, "m" is the number of units of S, and "y" is a coefficient for S. For example, assume U and S are minutes, D is 20 minutes, n=100 minutes, x=1, m=80 minutes, and y=1.

$$P=20-100*1+80*1=0$$

The larger performance P gets, the more the member gets to use the shared resources of sharing group 316. Once performance P is less than a threshold, then the member does not get to use the shared resources of sharing group 316. At the same time, the member is not allowed to further share the member's telephone resources if performance P is greater than a threshold. These rules can be written as:

P>M1=member can use shared resources

P>M2=member does not need to share the member's telephone resources

P<N1=member cannot use shared resources

When P<N1, until P>N2 member can share the member's telephone resources

Generally M2>=M1; N2>=M1>N1

The above rules resolve several problems to ensure fairness in the usage of the telephone resources in sharing group 316: (1) a member shares more but gets less; (2) a member shares too much and it affects the member's own telephone usage; (3) a member uses more but does not share as much; and (4) changes in sharing to not sharing affects the smoothness of the operation.

Figure 6:
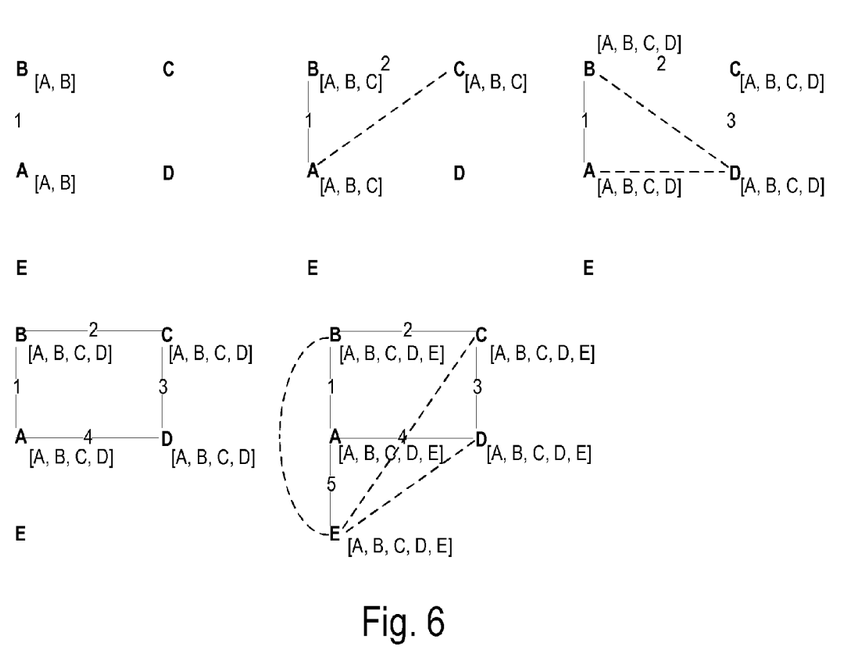
FIG. 6 illustrates a sharing group of the system of FIG. 3 where each member acts as a master node in one embodiment of the invention.

FIG. 6 is a connected graph illustrating the forming of a sharing group 316 where members A, B, C, D, and E each serves as a master node in one embodiment of the invention. In this embodiment, each member stores a membership list. A new member joins sharing group 316 by registering with any existing member. After registering the new member, the existing member or the new member must update the membership list at all other members with the relevant information of the new member.

When member B registers with member A through a connection 1, master node A updates its membership list with relevant information of member B and then provides the membership list to member B. When member C registers member B through a connection 2, member B updates its membership list with relevant information of member C and then provides the membership list to member C. Member C then reads the membership list for other members and finds member A. Member C then updates the new membership list to member A. The same process is repeated for members D and E so each member eventually has a membership list with the relevant information of members A, B, C, D, and E.

Figure 7:
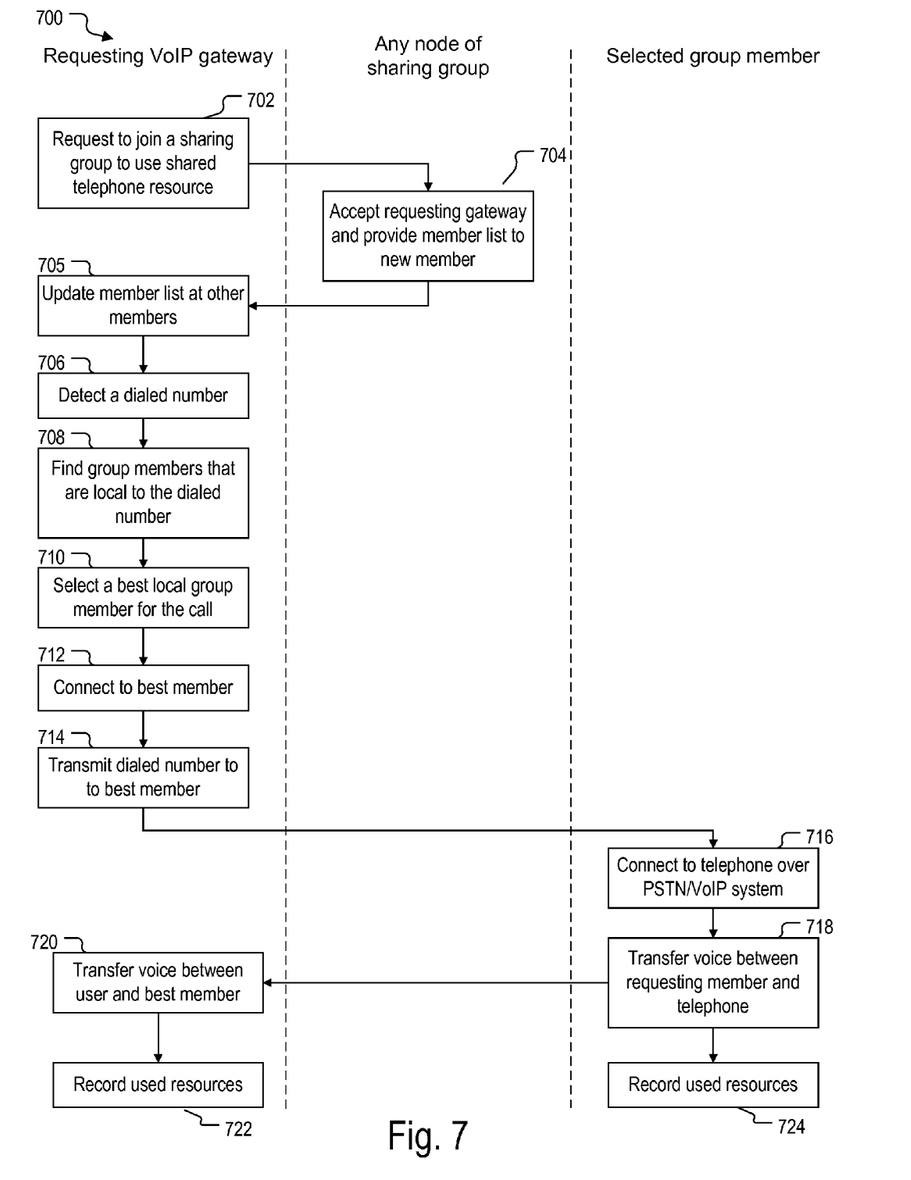
FIG. 7 is a flowchart of a method for the sharing group of FIG. 6 to share telephone lines in one embodiment of the invention.

FIG. 7 is a flowchart of a method 700 for system 300 to share telephone lines in one embodiment of the invention. In method 700, all the members serve as the master node as described above with FIG. 4. To demonstrate method 700, assume again David wishes to call his friend Alex in Shanghai, China.

In step 702, VoIP device 304 (FIG. 3) first joins sharing group 316 (FIG. 3). To become a member, VoIP device 304 registers with any member of sharing group 316. During registration, VoIP device 304 provides its telephone number, IP address, network performance/condition, and region to the master node. VoIP device 304 also selects a way to pay for the use of the telephone resources of sharing group 316 as described above.

In step 704, the member accepts the request from VoIP device 304 to join sharing group 316 and adds VoIP device 304 to a member list of sharing group 316 with the telephone numbers, the IP addresses, the performance values, and the regions of all the members. The member then provides to VoIP device 304 the member list of sharing group 316 so VoIP device 304 can perform the functions of a master node.

In step 705, VoIP device 304 updates all the members with the membership list including its telephone number, IP address, network performance/condition, and region. Steps 702, 704, and 705 are only performed once. After VoIP device 304 becomes part of sharing group 316, it can proceed to step 706 to call a telephone outside of its regional telephone system 308 using the telephone resources of sharing group 316.

In step 706, VoIP device 304 detects the user dial the number of telephone 314.

In step 708, VoIP device 304 searches through the members list for members that can connect to telephone 314 for free or at a low cost through their regional telephone system.

In step 710, VoIP device 304 selects a member that has the best network connection, is willing to share, is current idle, and has not excessively shared its telephone resources. For demonstrating method 700, assume VoIP device 310 (FIG. 3) is the best member. VoIP device 304 also verifies that it has sufficient credit to use the shared telephone resources based on its performance value in the membership list.

In step 712, VoIP device 304 connects to VoIP device 310 over IP network 306.

In step 714, VoIP device 304 begins the telephone call by transmitting telephone commands to VoIP device 310. The telephone commands include on hook, off hook, and the telephone number to be dialed. VoIP device 304 transmits the telephone commands in packets over network 306 to VoIP device 310.

In step 716, VoIP device 310 consummates the telephone call by calling telephone 314 through regional telephone system 312 (FIG. 3).

In steps 718 and 720, VoIP devices 304 and 310 transfer voice signals between the caller David at telephone 302 and the recipient Alex at telephone 314. If VoIP device 310 is connected to a PSTN 312, it must convert the digital signals received from VoIP device 304 to analog telephone signals before transmitting them to the PSTN, and it must convert the analog telephone signals received from the PSTN to digital signals before transmitting them to VoIP device 304. If VoIP device 310 is connected to a VoIP system 312, it passes the digital signals between VoIP device 304 and VoIP system 312 in accordance with VoIP standards, such as H.323, SIP, RTP, G.711, G.729, and G.723.

In steps 722 and 724, VoIP devices 304 and 310 record the usage of the shared telephone resources to debit payment from the David's account associated with VoIP device 304, and credit payment to the Michael's account associated with VoIP device 310 in the membership list. VoIP device 304 also updates the membership list at all the other members with the new performance values of VoIP devices 304 and 310.

Figure 8:
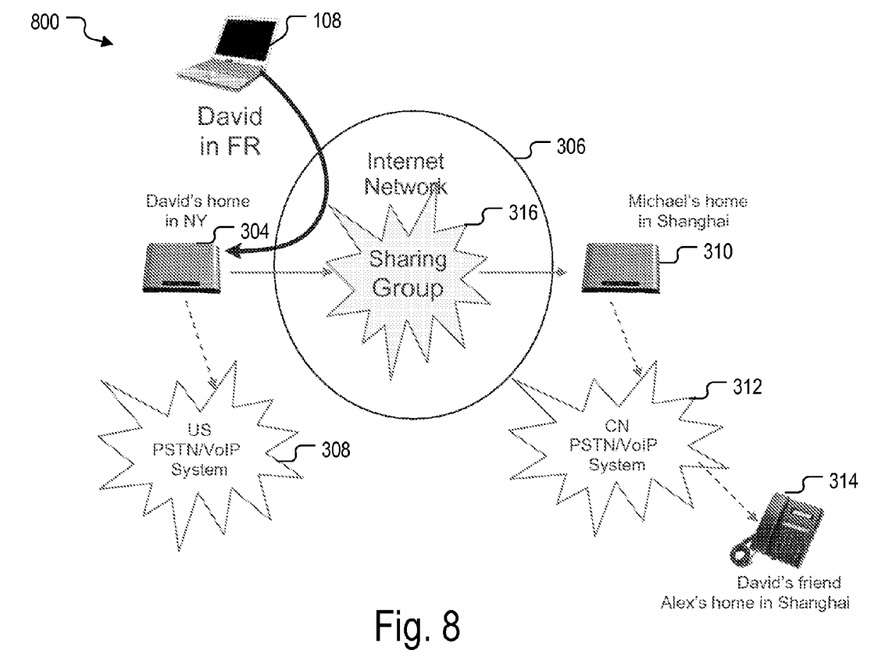
FIG. 8 illustrates a system for combining individual and group sharing of telephone lines in one embodiment of the invention.

FIG. 8 illustrates a system 800 that combines systems 100 and 300 in one embodiment of the invention. Specifically, David is in France and he uses computer 108 to access VoIP device 304 in the U.S. over IP network 306 to call Alex's telephone 314 in China.

Figure 9:
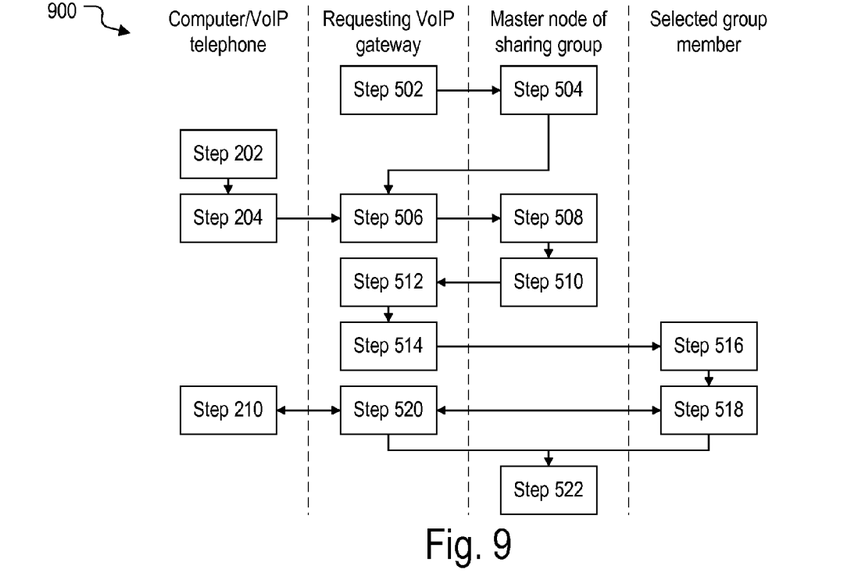
FIG. 9 is a flowchart of a method for the system of FIG. 8 to share telephone lines in one embodiment of the invention.

FIG. 9 illustrates a method 900 for system 800 to share telephone resources in one embodiment of the invention. Specifically, method 900 combines methods 200 and 500 so that David can use computer 108 to connect to VoIP device 304 (FIG. 8) to use the telephone resources of sharing group 306 (FIG. 8).

In step 502, VoIP device 304 requests to join sharing group 306.

In step 504, the master node accepts the request from VoIP device 304 to join sharing group 306.

In step 202, computer 108 (FIG. 8) connects to VoIP device 304 over public IP network 306.

In step 204, computer 108 begins a telephone call to telephone 314 by transmitting telephone commands, including the number of telephone 314 (FIG. 8), to VoIP device 304 over IP network 306.

In step 506, VoIP device 304 receives the number of telephone 314 from computer 108 and transmits it to the master node over public IP network 306.

In step 508, the master node authenticates VoIP device 304 and verifies that VoIP device 304 has sufficient credit to use the shared telephone resources.

In step 510, the master node searches for the best member that is connected to a regional telephone system that can connect to telephone 314 for free or at a low cost. For demonstrating method 900, assume VoIP device 310 (FIG. 8) is the best member. The master node then provides the IP address of the best member to VoIP device 304.

In step 512, VoIP device 304 connects to VoIP device 310 over IP network 306.

In step 514, VoIP device 304 begins the telephone call by transmitting telephone commands, including the number of telephone 314, to VoIP device 310 over network 306.

In step 516, VoIP device 310 consummates the telephone call by calling telephone 314 through regional telephone system 312 (FIG. 8).

In steps 518 and 520, VoIP devices 304 and 310 transfer voice signals between VoIP device 314 and the recipient Alex at telephone 314. In steps 520 and 210, VoIP device 304 and computer 108 transfer voice signals between computer 108 and VoIP device 304 to provide a telephone call between David and Alex.

In step 522, VoIP devices 304 and 310 report the usage of the shared telephone resources to the master node for accounting purposes.

Figure 10:
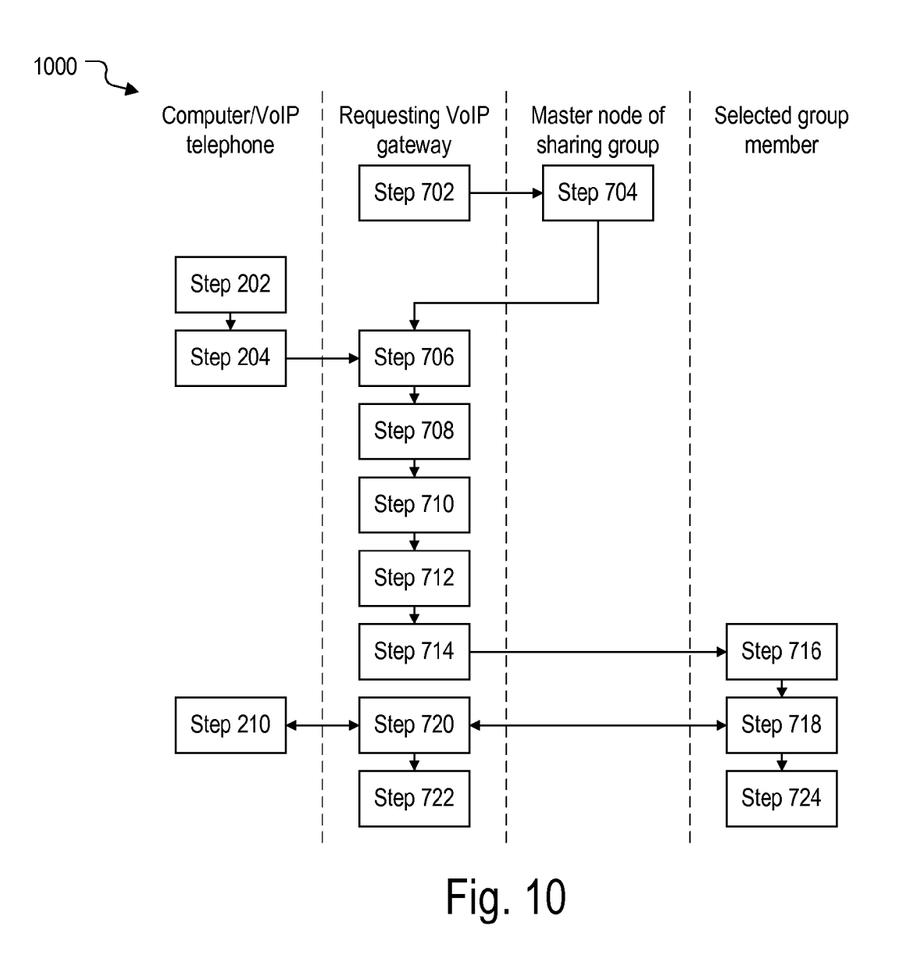
FIG. 10 is a flowchart of another for the system of FIG. 8 to share telephone lines in one embodiment of the invention.

FIG. 10 illustrates a method 1000 for system 800 to share telephone resources in one embodiment of the invention. Specifically, method 1000 combines methods 200 and 700 so that David can use computer 108 to connect to VoIP device 304 (FIG. 8) to use the telephone resources of sharing group 306 (FIG. 8).

In step 702, VoIP device 304 first joins sharing group 316 by registering with any group member.

In step 704, the member accepts the request from VoIP device 304 to join sharing group 316. The member then provides to VoIP device 304 a member list of sharing group 316 with the telephone numbers, the IP addresses, the performance values, and the regions of all the members.

In step 705, VoIP device 304 updates all the members with a new membership list including its telephone number, IP address, performance value, and region.

In step 202, computer 108 (FIG. 8) connects to VoIP device 304 over public IP network 306.

In step 204, computer 108 begins a telephone call to telephone 314 by transmitting telephone commands, including the number of telephone 314 (FIG. 8), to VoIP device 304 over IP network 306.

In step 706, VoIP device 304 receives the number of telephone 314 from computer 108.

In step 708, VoIP device 304 searches through the members list for members that can connect to telephone 314 for free or at a low cost through their regional telephone system.

In step 710, VoIP device 304 selects a member that has the best network connection, is willing to share, is current idle, and has not excessively shared its telephone resources. For demonstrating method 1000, assume VoIP device 310 (FIG. 8) is the best member. VoIP device 304 also verifies that it has sufficient credit to use the shared telephone resources.

In step 712, VoIP device 304 connects to VoIP device 310 over IP network 306.

In step 714, VoIP device 304 begins the telephone call by transmitting telephone commands, including the number of telephone 314, to VoIP device 310 over network 306.

In step 716, VoIP device 310 consummates the telephone call by calling telephone 314 through regional telephone system 312 (FIG. 8)

In steps 718 and 720, VoIP devices 304 and 310 transfer voice signals between VoIP device 314 and the recipient Alex at telephone 314. In steps 720 and 210, VoIP device 304 and computer 108 transfer voice signals between computer 108 and VoIP device 304 to provide a telephone call between David and Alex.

In steps 722 and 724, VoIP devices 304 and 310 record the usage of the shared telephone resources to debit payment from the David's account associated with VoIP device 304, and credit payment to the Michael's account associated with VoIP device 310.

Various other adaptations and combinations of features of the embodiments disclosed are within the scope of the invention. Numerous embodiments are encompassed by the following claims.

The invention claimed is:

1. A method for a first Voice over Internet Protocol (VoIP) device connected to an IP network and a first telephone system to share its telephone resource, comprising:
    joining a group of VoIP devices connected to the IP network, the group sharing its telephone resources;
    receiving from a caller a telephone number to call a device;
    determining a subgroup of the VoIP devices located in the same region as the device;
    selecting, from the subgroup of the VoIP devices, a second VoIP device that offers the best performance value less than a threshold, the performance value having an initial value, the performance value being credited each time or each minute that telephone resources of the second VoIP device are shared, the performance score being debited each time or each minute the telephone resources of the group are used by the second VoIP device;
    connecting to the second VoIP device over the IP network;
    transmitting the telephone number to the second VoIP device, wherein the second VoIP device connects to the device through a second telephone system; and
    transmitting to and receiving from the second VoIP device voice signals between the caller and a recipient at the device.

2. The method of claim 1, wherein:
    the first and the second telephone systems are selected from the group consisting of a public switched telephone network (PSTN) and a VoIP telephone system; and
    the device is selected from the group consisting of a plain old telephone service (POTS) telephone and a VoIP telephone.

3. The method of claim 1, wherein said joining a group of VoIP devices comprises:
    registering with a master of the group by providing an IP address and at least one of a telephone number and a region of the first VoIP device, the master having a membership list including IP addresses, telephone numbers, and regions of the VoIP devices.

4. The method of claim 3, wherein the master is selected from the group consisting of one of the VoIP devices and a dedicated server computer.

5. The method of claim 1, further comprising, prior to said connecting to a second VoIP device:
    querying a master of the group for at least one VoIP device located in the same region as the device; and
    receiving an IP address of the second VoIP device from the master.

6. The method of claim 3, wherein the membership list of the VoIP devices further includes performance values for the VoIP devices, the performance values determine if each VoIP device can share its telephone resource and use the telephone resources of the group.

7. The method of claim 6, wherein the performance value is determined as follows:

$$P = D - n*U*x + m*S*y,$$

where "P" is the performance value, "D" is the initial value, "U" is a unit of the telephone resources of the group used by the second VoIP device, "S" is a unit of the telephone resources shared by the second VoIP device, "n" is the number of units U, "x" is a coefficient for U, "m" is the number of units of S, and "y" is a coefficient for S.

8. The method of claim 7, wherein:
    when P>M1, the second VoIP device can use shared resources;
    when P>M2, the second VoIP device cannot share its telephone resource;
    when P<N1, the second VoIP device cannot use the telephone resources of the group; and
    when P<N1, until P>N2, the second VoIP device can share its telephone resources;
    "M1," "M2," "N1," "N2" are thresholds and M2>=M1 and N2>=M1>N1.

9. The method of claim 1, wherein said joining a group of VoIP devices comprises:
    registering with one of the VoIP devices to receive a membership list including IP addresses, telephone numbers, and regions of the VoIP devices, wherein each VoIP device stores the membership list.

10. The method of claim 9, further comprising, prior to said connecting to the second VoIP device:
    searching the membership list for at least one VoIP device located in the same region as the device; and
    retrieving an IP address of the second VoIP device from the membership list.

11. The method of claim 9, wherein the membership list of the VoIP devices further includes performance values for the VoIP devices, the performance values determine if each VoIP device can share its telephone resource and use the telephone resources of the group.

12. The method of claim 11, wherein the performance value is determined as follows:

$$P=D-n*U*x+m*S*y,$$

where "P" is the performance value, "D" is the initial value, "U" is a unit of the telephone resources of the group used by the second VoIP device, "S" is a unit of the telephone resources shared by the second VoIP device, "n" is the number of units U, "x" is a coefficient for U, "m" is the number of units of S, and "y" is a coefficient for S.

13. The method of claim 12, wherein:
when P>M1, the second VoIP device can use shared resources;
when P>M2, the second VoIP device cannot share its telephone resource;
when P<N1, the second VoIP device cannot use the telephone resources of the group; and
when P<N1, until P>N2, the second VoIP device can share its telephone resources;
"M1," "M2," "N1," "N2" are thresholds and M2>=M1 and N2>=M1>N1.

14. The method of claim 1, wherein said receiving from a caller a telephone number to call a device comprises:
connecting to another device over the IP network; and
receiving a request from the another device to call the device with the telephone number.

15. The method of claim 14, wherein:
the first and the second telephone systems are each selected from the group consisting of a public switched telephone network (PSTN) and a VoIP telephone system;
the device is one of a plain old telephone service (POTS) telephone and a VoIP telephone; and
the another device is one of a computer and a VoIP telephone.

* * * * *